United States Patent [19]
Knaak

[11] 3,808,989
[45] May 7, 1974

[54] METHOD AND ARRANGEMENT FOR JOINTLY COMBUSTING HOUSEHOLD REFUSE AND SEWAGE SLUDGE

[75] Inventor: Ruediger Knaak, Heinestrasse, Germany

[73] Assignee: Koppers-Wistra-Ofenbau GmbH, Duesseldorf-Heerdt, Germany

[22] Filed: Jan. 3, 1973

[21] Appl. No.: 320,754

[30] Foreign Application Priority Data
Jan. 7, 1972  Germany............................ 2200756

[52] U.S. Cl................................ 110/14, 110/15
[51] Int. Cl............................................. F23g 5/04
[58] Field of Search................ 110/8 R, 10, 14, 15

[56] References Cited
UNITED STATES PATENTS

| | | |
|---|---|---|
| 2,015,842 | 10/1935 | Christensen ........................ 110/10 |
| 2,213,668 | 9/1940 | Dundas et al. ..................... 110/15 |
| 2,389,077 | 11/1945 | Peterson et al. ................ 110/15 X |
| 2,269,273 | 1/1942 | Krogh et al. ................... 110/14 X |
| 3,060,869 | 10/1962 | Reilly ................................... 110/8 |
| 3,208,411 | 9/1965 | Urban et al. ....................... 110/10 |

*Primary Examiner*—Kenneth W. Sprague
*Attorney, Agent, or Firm*—Michael S. Striker

[57] ABSTRACT

A mix of household refuse and sewage sludge is admitted onto a furnace grate over which it travels. During this travel the mix is dried, ignited and partially combusted. From a discharge end of the grate the partially combusted mix is discharged directly into a rotary furnace drum wherein combustion is completed. The combustion gases developing during partial combustion on the grate and during final combustion in the furnace drum are separately withdrawn and are thereupon united before being passed into a gas cooler.

7 Claims, 1 Drawing Figure

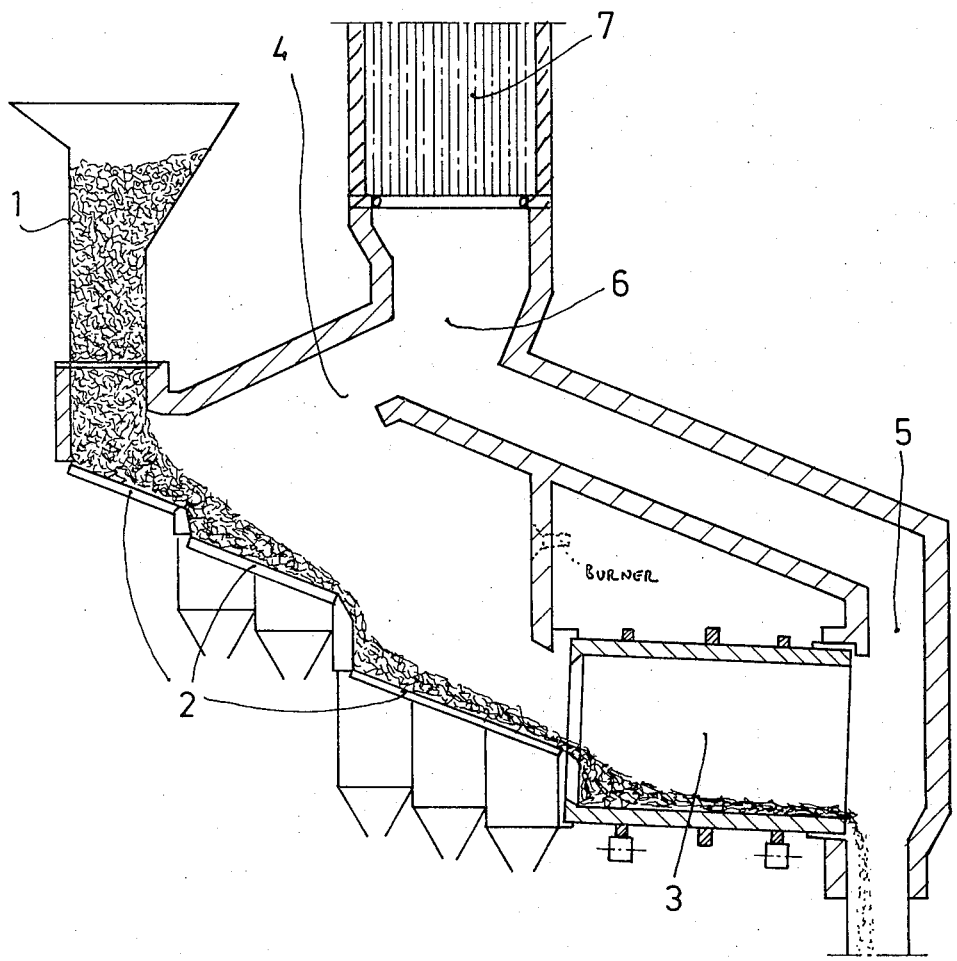

METHOD AND ARRANGEMENT FOR JOINTLY COMBUSTING HOUSEHOLD REFUSE AND SEWAGE SLUDGE

BACKGROUND OF THE INVENTION

The present invention relates generally to the combustion of waste, and more particularly to the joint combustion of household refuse and sewage sludge. Still more particularly the invention relates to a method of effecting such joint combustion and to an arrangement for carrying out the method.

To an increasing degree municipalities throughout the world are beset by difficulties in disposing of the ever larger quantities of refuse that are being produced. One the one hand, the quantity of refuse being produced per capita increases, whereas on the other hand the requirements made of disposal facilties are becoming more and more strict. In many instances, particularly in metropolitan areas, it is no longer possible to merely cart refuse to a designated dump, because space availability for such dumps is limited and in many instances has been exhausted or very nearly so.

This means that the refuse must be combusted in order to dispose of it, but of course installations for effecting such combustion are relatively expensive to construct and to maintain.

Of late, another problem has been added to these difficulties, namely how to dispose of sewage sludge remaining as a residue in the sewage clarifying installations of municipalities. Here, also, there are many instances where it is difficult to dispose of the sludge and municipalities have begun to dry or de-water the sludge so that it can be combusted.

As long as both municipal solid refuse and sewage sludge must be combusted, and installations provided for this purpose, it would appear practical to attempt to combust them both together. This has in fact already been proposed and has inherently attractive possibilities, because the characteristics of sewage sludge and municipal refuse complement one another very nicely with respect to their combustion. The reason for this is to a large extent to be found in the particular characteristics of household refuse as it is being generated in the industrial nations today. Examinations have shown that the heating value of such refuse is on the order of 2,000 kcal/kg, and still tends to increase due to the particular mix of refuse that is being generated (e.g., packaging, plastics, paper, etc.). However, for reasons known to those skilled in the art the combustion and combustion-gas temperature must not exceed approximately 1,000° C when the refuse is combusted, and it is therefore necessary to supply large quantities of excess air to the combusting refuse. This means that the combustion-air cooling devices, such as scrubbers, conduits, chimneys and the like, must be constructed to take these considerations into account.

If, now, the sewage sludge is de-watered to approximately 65–75 percent water content, then such an amount of de-watering can be carried out with a simple, economical and continuously operating de-watering installation. This facilitates the de-watering of the sewage sludge which is obtained from the municipal sewage system. Moreover, if one considers the possibility of admixing the sewage sludge with the houshold refuse for combustion, then a de-watering to one 65–75 percent water content in the sewage sludge is not only sufficient but has certain attractions. In particular, if one assumes that the sewage sludge admixed with the household refuse is that amount generated by the same size of population that has generated the household refuse, then the mix obtained thereby will have its caloric heating value substantially reduced due to the high water content of the sewage sludge. The resulting reduced heating value, however, does not require the admission of large quantities of excess air to reduce combustion and combustion-gas temperatures, and does not require auxiliary combustion either. In practice this means that under such circumstances the amount of sewage sludge generated by the same population size that has generated the refuse to be combusted, can be completely combusted together with the refuse and, at the same time, can yield the advantages mentioned above with respect to the decreased caloric heating value and a consequent reduction in the structural and maintenance requirements made of the equipment provided for this purpose.

It is already known to combust refuse in rotary furnace drums, that is in furnaces in which the refuse is admitted into a drum which rotates while combustion takes place. The constant turnover of the refuse admitted into the drum, resulting from the continuous rotation of the drum during combustion, produces a good mechanical separation and opening-up of the refuse mix, including those components which tend to be difficult to combust. This would, for instance, include cast-off telephone books, discarded cabbages, discarded oranges and the like, all materials which tend to be covered with an outer surrounding layer of ashes when heated for combustion purposes, resulting from the combustion of the outer layer or layers of the material. This ash layer prevents or retards the access of oxygen to the non-combusted core, and thereby prevents the complete combustion. The mechanical agitation to which the refuse is subjected in the rotary drum removes this outer ash layer and makes possible a complete combustion of even difficult-to-combust components such as those mentioned above. However, rotary drums have the disadvantage that air will contact the refuse only at its surface, that is at the surface of the refuse bed, so that air cannot be passed properly through the refuse mix whereby the efficiency of such drums in terms of throughput is limited. Also, combustion air can usually be supplied only from one end of the drum.

Another approach known for the combustion of refuse is to combust it on furnace grates of various different types well known in the art. Of course, in such instances the mechanical agitation that can be imparted to the refuse is not as intense as in the drum, and therefore the combustion of such difficult-to-combust components as mentioned above is not as effective. On the other hand, combusting on grates has the advantage that combustion air can be passed through the entire bed of refuse and can be supplied in required amounts to different portions of the bed to thereby control combustion as desired. This means that high combustion efficiency in terms of throughput can be obtained.

Another combustion arrangement known from the art is an installation in which the drying, ignition and partial combustion of refuse is effected on furnace grates, from where the partly combusted refuse is then admitted into a rotary furnace drum to be finally combusted.

All that has been set forth above is concerned with the combustion of household refuse, such as will be collected by municipal refuse collection agencies. However, it has been found that sewage sludge can also be readily combusted in rotary furnace drums. Here, however, there has been the apprehension that the admitted quantity of sludge will tend to slide on the inner wall of the drum during rotation thereof and will not become agitated, that is it will not become raised up along the side of the drum to fall down to the lowermost part of the drum and thereby become agitated. In the art this has been avoided by providing projections on the inner surface of the drum which engage the quantity of sludge and tend to prevent it from slipping so that it will in fact pass partly up the side of the drum before it falls back. In some instances it has been proposed to construct these projections in form of shovel-like members.

Having pointed out how refuse and sewage sludge can be combusted separately, it is now necessary to further point out that a joint combustion of the two has not heretofore been successfully carried out. Attempts have been made to provide a mix of refuse and sewage sludge and to combust this mix on furnace grates. However, the sewage sludge when present in the mix will have the form of small clumps of sludge and it has been observed that under the influence of the strong combustion heat these small clumps tend to become very quickly surrounded with a hard crust of ashes or slag which prevents the evaporation of the water content of that amount of sludge which is enclosed in its interior, and which also prevents the admission of oxygen into contact with the interior, so that a combustion of the clumps is prevented once the hard crust has formed. Some success has been achieved in the prior art by limiting the percentage by weight of sewage sludge to approximately 15-20 percent of that of the refuse, and then combusting the resulting mix on furnace grates. However, in the first place this is not nearly as efficient as is desirable, because the amount of sludge that can be combusted is small with respect to the amount of refuse with which it must be admixed. In the second place it is absolutely necessary in such instances that the sludge will have only the form of small clumps or will be crumbly so that the aforementioned problem concerning the formation of the hard crust is reduced or avoided, and of course the sludge must be thoroughly admixed with the refuse.

All of this indicates that the state of the art in this respect is not yet as well developed as is desirable.

SUMMARY OF THE INVENTION

It is, accordingly, an object of the present invention to provide a method of effecting the joint combustion of household refuse and of sewage sludge which overcomes the disadvantages of the prior art.

More particularly it is an object of the present invention to provide such a method in which there are no limitations concerning the relationship of sewage sludge to household refuse.

Another object is to provide such a method in which there are no specific requirements made of the consistency and the water content of the de-watered sewage sludge.

Still a further object of the invention is to provide such a method which can operate economically and wherein only simple de-watering of the sewage sludge is required.

A further object of the invention is to provide an improved apparatus or arrangement for carrying out the invention.

In keeping with these objects, and others which will become apparent hereafter, one feature of the invention resides in a method of jointly combusting household refuse and sewage sludge, which method briefly stated comprises the steps of admitting a mix of household refuse and sewage sludge onto a furnace grate, drying, igniting and partly combusting the mix on the grate, discharging the partially combusted mix from the grate into a rotary furnace drum, and completing the combustion of the mix in the drum during rotation of the same.

The discharge of the mix is directly from a discharge end of the grid into the drum, and the combustion gases which develop during combustion on the grate are withdrawn in a path which is separate from the path in which the combustion gases developing in the drum are withdrawn. However, the two streams of combustion gases are united before they are fed into the gas coolers and scrubbers.

The novel features which are considered a characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic illustration of an arrangement in accordance with the invention.

DESCRIPTION OF THE PREFERRED EMBODIMENTS

The illustration in the drawing is highly diagrammatic, showing only those components of the arrangement which are necessary for an understanding of the invention. Inherently the individual components are well known to those skilled in the art and it will be seen that reference numeral 1 designates a hopper or chute which receives a mixture of household refuse and sewage sludge. Reference numeral 2 designates mechanical furnace grates onto which the mixture is discharged. In the illustrated embodiment the grates are downwardly inclined so that the mixture will move over them. During such movement the mixture undergoes combustion in known manner, with air being circulated through the bed of mixture so that the latter first dries under the influence of the hot air and combustion air, thereupon becomes ignited and then is partially combusted.

As the mixture is partially combusted it reaches the discharge end of the grates 2 from where it is directly discharged into a rotary furnace drum 3 which rotates about its longitudinal axis as is well known in the art. In the furnace drum 3 the already partially combusted mixture undergoes final combustion, in a manner known to those skilled in the art, with heating means being of course provided both with respect to the drum and with respect to the grids.

The combustion gases developing above the grates 2 are withdrawn via the passage 4, which is separate from the passage 5 through which the combustion gases developing in the drum 3 are withdrawn. However, at 6 the two streams of combustion gases are united and are then admitted into the unit 7, wherein their heat may be exploited before they are finally cooled and scrubbed to be discharged in known manner.

It should be understood that it is not necessary to supply a mix of household refuse and sewage sludge into the hopper 1, but that the refuse and sewage sludge could be admitted onto the grates 2 separately to form a mix on the grates themselves, rather than before being admitted to the grates.

As mentioned earlier, the use of grates on which the refuse (not mixed with sewage sludge) is partially combusted and is then discharged into a rotary furnace drum to be finally combusted therein, is already known from the art. However, it has heretofore been believed that such an approach could not work with a mixture of household refuse and sewage sludge, because it was an opinion strongly held in the art that the tendency of sewage sludge clumps to develop a hard crust of ashes of slag during partial combustion on the grates would prevent their final combustion if admitted into a rotary furnace drum. In other words, it was thought that the prior partial combustion of the sewage sludge clumps in a mix of sewage sludge and household refuse on furnace grates would negate the beneficial effects of subsequent admission into a rotary furnace drum. It has been found according to the present invention, however, that this aforementioned assumption is erroneous. It has also been found that the assumption is erroneous that the partially combusted mix of household refuse and sewage sludge would not be raised up by the walls of the rotating drum unless the latter is provided with internal projections, so that allegedly the agitation effect of the mix could not be obtained and the mix would slide on the wall and would behave more like a viscous liquid in the drum. My investigations have shown that these are mistakenly held beliefs which do not apply in actual practice, and that the proper combustion of a mix of household refuse and sewage sludge is governed in a combined grid and rotary drum installation by other considerations, namely the following:

The household refuse as it is supplied by the municipal collection agency contains a certain percentage of solid bodies which do not lose their mechanical stability during combustion. This includes stones, glass, china, steel, iron, metal cans and the like. Evidently, these components will constitute the larger a proportion of the mixture, the farther the combustion of the mixture has proceeded. This means that in the furnace, particularly in the region of the drum where the final residue is discharged, there is essentially only a mixture of solid bodies, ashes and sewage sludge clumps. During the rotation of the drum the solid bodies act upon the sewage sludge clumps (which are surrounded by the hard shells of ashes) in the same manner in which the balls of a ball mill act upon material to be comminuted, that is they break up the clumps during the rotation of the drum, comminuting them. In particular, the solid bodies tend to effect such breaking-up of the sewage sludge clumps when they roll on the refuse mix inclination which tends to form in the drum and drop onto sewage sludge clumps which they contact.

Furthermore, it has been observed that over a certain period of time the inner surface of the refractory material lining such a rotary furnace drum tends to develop slag encrustations which make the surface rough and uneven. Such roughness assures that there is sufficient adhesion of the refuse mix to the surface without any necessity for providing internally extending projections, so that the refuse mix will in fact be taken along by the drum during rotation thereof, to be raised and subsequently dropped again, without having to provide such projections. In other words, the drum need not have any projections and its cross section can be circular in any plane transverse to its longitudinal axis of rotation without incurring the difficulties which heretofore have been feared in the art.

The arrangement according to the present invention thus can carry out the novel method, and it can do so in a simple and reliable manner which heretofore had been thought to be impossible.

It will be understood that each of the elements described above, or two or more together, may also find a useful application in other types of applications differing from the types described above.

While the invention has been illustrated and described as embodied in an arrangement for the joint combustion of household refuse and sewage sludge, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of jointly combusting household refuse and sewage sludge, comprising the steps of forming a mix of household refuse and sewage sludge; drying, igniting and partially combusting the mix on a furnace grate; discharging the partially combusted mix from said grate into a rotary furnace drum; and completing combustion of said mix in said drum during rotation of the same.

2. A method as defined in claim 1; further comprising the step of withdrawing developing combustion gases in separate paths from above said grate and from within said drum.

3. A method as defined in claim 2; and further comprising the steps of mixing the combustion gases from said separate paths; and cooling the gases.

4. In an arrangement for jointly combusting household refuse and sewage sludge, a combination comprising grate means arranged to accept a mix of household refuse and sewage sludge for drying, ignition and partial combustion, said grate means having a discharge end for discharge of the partially combusted mix; and a rotary furnace drum adjacent said discharge end and positioned to receive the partially combusted mix so as to complete combustion of the same.

5. A combination as defined in claim 4, wherein said grate means is downwardly inclined in direction toward said discharge end so as to cause advancement of said mix in direction toward the same.

6. A combination as defined in claim 4, wherein said drum rotates about its longitudinal axis; and wherein the inner cross-section of said drum is circular in any plane transverse to said axis.

7. A combination as defined in claim 4; further comprising passage means for separately withdrawing combustion gases from above said grate means and from within said drum, and for thereupon uniting the separately withdrawn combustion gases preparatory to admission into a combustion gas cooling device.

* * * * *